(12) United States Patent
Lu et al.

(10) Patent No.: US 10,349,474 B2
(45) Date of Patent: Jul. 9, 2019

(54) LAMP TUBE CAPABLE OF RECTIFYING AND STABILIZING VOLTAGES

(71) Applicant: Xiamen PVTECH Co., Ltd., Xiamen, Fujian (CN)

(72) Inventors: Fuxing Lu, Fujian (CN); Minghui Qiu, Fujian (CN); Rongtu Liu, Nanan (CN)

(73) Assignee: Xiamen PVTECH Co., Ltd., Xiamen, Fujian (CN)

( * ) Notice: Subject to any disclaimer, the term of this patent is extended or adjusted under 35 U.S.C. 154(b) by 91 days.

(21) Appl. No.: 15/839,856

(22) Filed: Dec. 13, 2017

(65) Prior Publication Data

US 2019/0014630 A1 Jan. 10, 2019

(30) Foreign Application Priority Data

Jul. 7, 2017 (CN) .......................... 2017 1 0549816

(51) Int. Cl.
*H05B 33/08* (2006.01)
*F21K 9/278* (2016.01)
*F21K 9/272* (2016.01)

(52) U.S. Cl.
CPC ..... *H05B 33/0809* (2013.01); *H05B 33/0815* (2013.01); *F21K 9/272* (2016.08); *F21K 9/278* (2016.08); *H05B 33/0887* (2013.01)

(58) Field of Classification Search
USPC ................................ 362/222, 231, 235, 253
See application file for complete search history.

(56) References Cited

U.S. PATENT DOCUMENTS

2013/0293151 A1* 11/2013 Puvanakijjakom ......................... H05B 33/0815 315/297
2014/0001885 A1* 1/2014 Xiao .................... H03K 17/962 307/116

* cited by examiner

*Primary Examiner* — Allyson N Trail
(74) *Attorney, Agent, or Firm* — Winston Hsu

(57) ABSTRACT

An LED lamp tube capable of rectifying and stabilizing voltages includes an LED component. Two ends of the LED lamp tube respectively include two conductive pin assemblies, a polarity conversion module, a suppressor, and a voltage buck-booster module. The polarity conversion module includes two voltage conversion devices connected to the conductive pin assemblies. A set of capacitors is electrically connected between each of the voltage conversion devices to operate a circuit in an electronic rectifier to compensate and stabilize an input voltage.

9 Claims, 4 Drawing Sheets

LAMP TUBE CAPABLE OF RECTIFYING AND STABILIZING VOLTAGES

BACKGROUND OF THE INVENTION

1. Field of the Invention

The present invention relates to an LED lamp tube, in particular to an LED lamp tube capable of rectifying and stabilizing voltages.

2. Description of the Prior Art

Recent years, with the trend of saving energy and reducing carbon emission, LED light sources are widely used in the markets for different applications. Specifically, LED lightings provide innovative lighting devices and efficiently reduce energy consumption. Hence, the LED lightings can be widely used in areas deficient in electricity and can be used in the worldwide markets.

A conventional fluorescent lamp comprises a lamp holder, a fluorescent lamp tube, an inductor ballast, a starter, etc. When an LED lamp tube is used to replace the fluorescent lamp tube for energy-saving, the starter is removed.

Market-available LED lamp tubes have to be used with respective mating launching devices. As a result, the standards of launching specifications for the conventional LED lamp tubes cannot be unified. The conventional LED lamp tube may have different launching specifications in electronic rectifier based launching or inductor rectifier based launching, and the conventional LED lamp tubes with different launching specifications have to be purchased separately. For example, if the launching requirement of the lamp holder is electronic rectifier based while the LED lamp tube is inductor rectifier based, the LED lamp tube cannot be launched in the lamp holder. Therefore, how to allow a single LED lamp tube to be compatible with both the launching specifications of electronic rectifier or inductor rectifier is an issue.

SUMMARY OF THE INVENTION

In view of these problems, the present invention provides an LED lamp tube capable of rectifying and stabilizing voltages, wherein the LED lamp tube comprises an LED component in the LED lamp tube, and two ends of the LED lamp tube respectively comprise two conductive pin assemblies, each of the conductive pin assemblies is formed by two pins, the LED lamp tube further comprises a polarity conversion module, a suppressor, and a voltage buck-booster module, the polarity conversion module comprises two voltage conversion devices, the voltage conversion devices are respectively connected to the conductive pin assemblies, wherein a capacitor is electrically connected between each of the voltage conversion devices, the suppressor is electrically connected to the polarity conversion module to absorb a generated surge voltage, the voltage buck-booster module is electrically connected to the suppressor to convert alternating current into direct current; wherein, input ends of the voltage conversion devices are respectively connected to the conductive pin assemblies, a set of capacitors is connected between the input ends of each of the voltage conversion devices to operate a circuit in an electronic rectifier to compensate and stabilize an input voltage.

In some embodiments, the LED lamp tube further comprises an inductor rectifier and a starter, wherein the inductor rectifier is electrically connected to one of the pins of one of the conductive pin assemblies, and the starter is connected to the pins of each of the conductive pin assemblies.

In some embodiments, the electronic rectifier is electrically connected to each of the pins of each of the conductive pin assemblies, and the electronic rectifier is limited and stabilized by the set of capacitors to output voltage.

In some embodiments, the LED lamp tube further comprises a plurality of capacitors electrically connected between each of the voltage conversion devices, and the electronic rectifier is limited and stabilized by the capacitors to output voltage.

In some embodiments, the LED lamp tube further comprises a holder for assembling the conductive pin assemblies, the polarity conversion module, the voltage buck-booster module, and the LED component, and the LED lamp tube further comprises a lampshade assembled to the holder to shield the LED component.

In some embodiments, the LED lamp tube is a T type lamp tube.

In some embodiments, the LED lamp tube is a T8 lamp tube, a T10 lamp tube, or a T12 lamp tube.

In some embodiments, the voltage conversion device is a rectifier.

In some embodiments, the rectifier is a bridge rectifier.

In some embodiments, the outer power source is a main supply in alternating-current voltage.

According to embodiments of the present invention, the polarity conversion circuit has a set of bridge rectifiers, input ends of the bridge rectifiers are connected to the conductive pin assemblies, and a set of capacitors are connected between the input ends of two bridge rectifiers to operate a circuit in an electronic rectifier to perform compensation, so that the input voltage of the lamp tube can be stabilized and the lamp tube can be operated reliably.

According to embodiments of the present invention, the LED lamp tube comprises the inductor rectifier and the starter. The LED lamp tube further comprises the suppressor. The suppressor ensures the surge voltage generated by the rectifier can be efficiently absorbed when the inputted power source is the electronic rectifier or the inductor rectifier so as to prevent the LED lamp tube being damaged by the surge voltage upon the light is turned on. Moreover, when the alternating-current voltage is inputted to any two pins of the conductive pin assemblies, the alternating-current voltage can pass through a complete bridge rectifier for rectifying. Therefore, a pulsed current can be provided for supplying the second-stage voltage buck and voltage booster as well as the LED light source.

Additionally, according to the present invention, the lighting assembly with a traditional fluorescent lamp tube can be modified by LED lamp tube (T8, T10, or T12 lamp tube) in an easy manner. Specifically, for the modification of a light having a lamp tube activated by an inductor rectifier, the starter of the light is removed and the lamp tube is replaced by the LED lamp tube according to the present invention. Conversely, for the modification of a light having a lamp tube activated by an electronic rectifier, the lamp tube is just replaced by the LED lamp tube according to the present invention.

The detailed features and the advantages of the present invention will become more obvious from the following description for any person having ordinary skills in the art to carry out the claimed invention. Further, based on the disclosure, the claims, and the accompanying drawings, any person having ordinary skills in the art can understand the purpose and the advantages of the present invention easily.

These and other objectives of the present invention will no doubt become obvious to those of ordinary skill in the art after reading the following detailed description of the preferred embodiment that is illustrated in the various figures and drawings.

DETAILED DESCRIPTION

Embodiments are described by the following paragraphs along with appended drawing. These embodiments may have modifications and they shall not be used for interpreting the claimed scope of the present invention.

Figure 1:
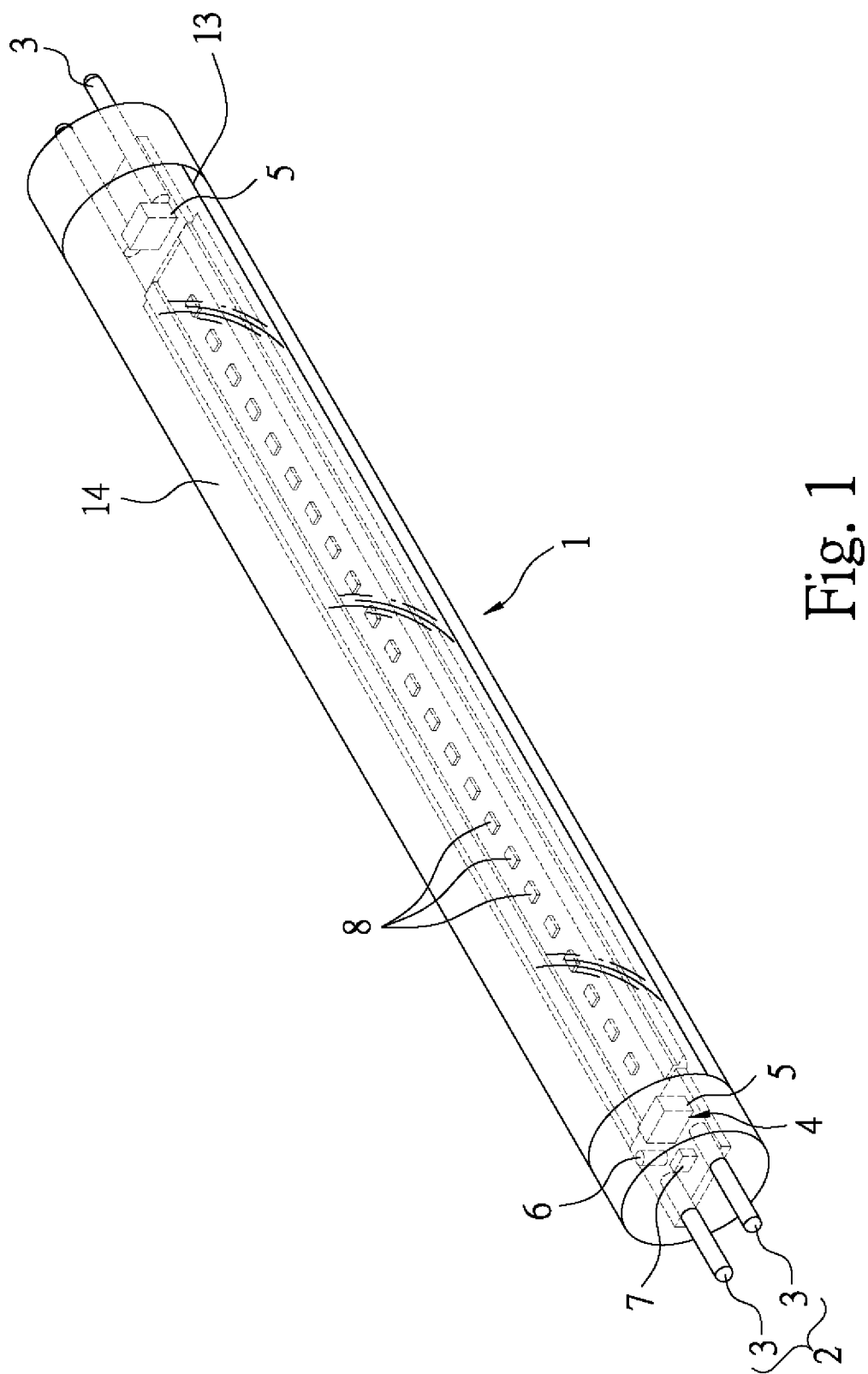
FIG. 1 illustrates a perspective view of an LED lamp tube according to a first embodiment of the present invention.
Figure 2:
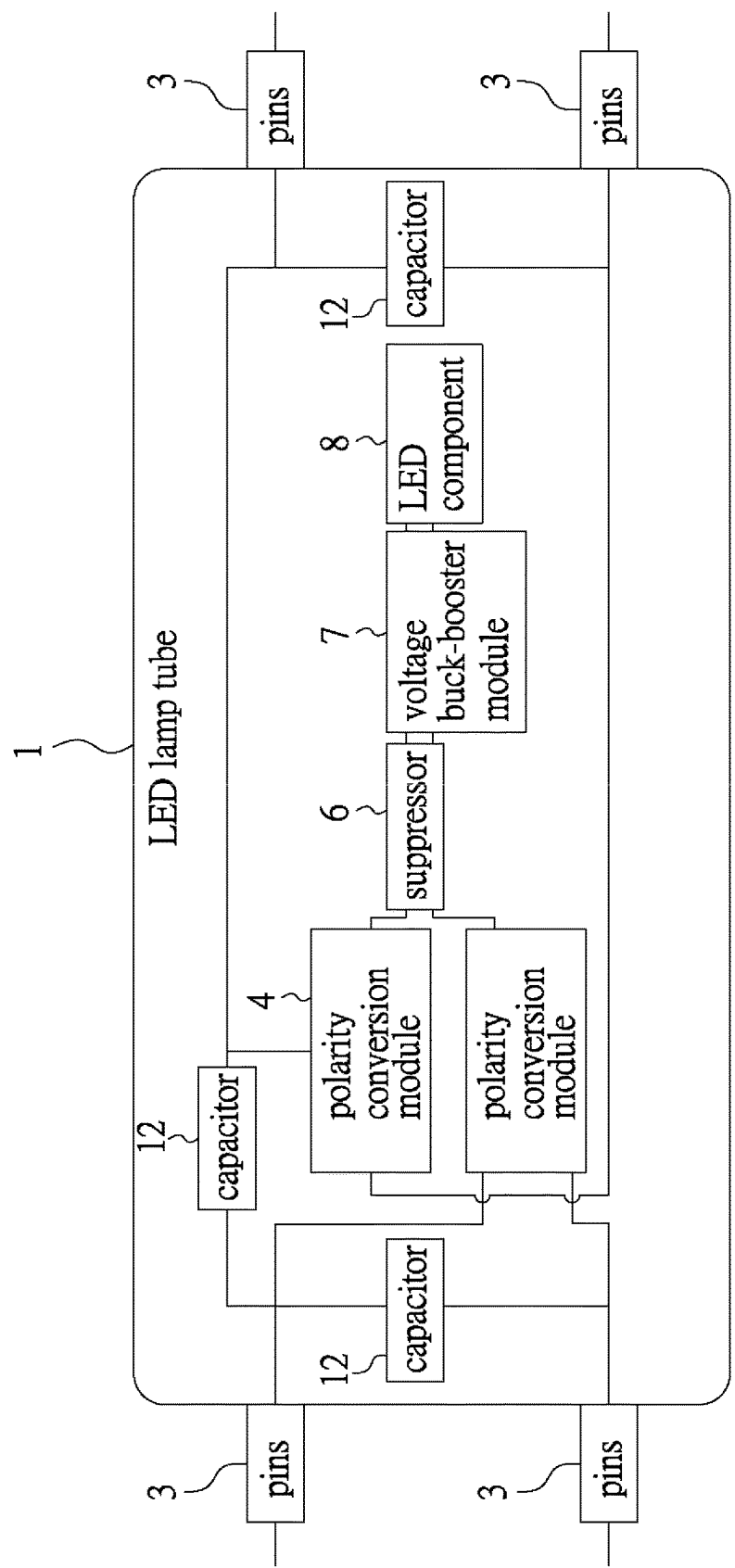
FIG. 2 illustrates a circuit block diagram of the LED lamp tube of the first embodiment.

The following embodiments allow the disclosure of the present invention to be full and clear. Person having ordinary skills in the art can realize the scope of the invention from these embodiments. Please refer to FIGS. 1 and 2, illustrating an LED lamp tube according to a first embodiment of the present invention. FIG. 1 illustrates a perspective view of the LED lamp tube, and FIG. 2 illustrates a circuit diagram view of the LED lamp tube. The LED lamp tube according to the present invention is an LED lamp tube capable of rectifying and stabilizing voltages, and the LED lamp tube is connected to an outer power source (a main supply in alternating-current voltage). The LED lamp tube 1 comprises two conductive pin assemblies 2, a polarity conversion module 4, a suppressor 6, a voltage buck-booster module 7, and an LED component 8.

Please refer to FIGS. 1 and 2. Each of the conductive pin assemblies 2 is formed by two pins 3. The two pins 3 of one of the two conductive pin assemblies 2 are at one of two ends of the LED lamp tube 1, and the two pins 3 of the other conductive pin assemblies 2 at the other end of the LED lamp tube 1. The pins 3 of the conductive pin assemblies 2 are used for connecting to the outer power source.

Please refer to FIGS. 1 and 2. The polarity conversion module 4 comprises two voltage conversion devices 5 (bridge rectifiers). The voltage conversion devices 5 are respectively connected to the conductive pin assemblies 2. A capacitor 12 is electrically connected between each of the voltage conversion devices 5.

Please refer to FIGS. 1 and 2. The suppressor 6 is electrically connected to the polarity conversion module 4 to absorb a generated surge voltage. The voltage buck-booster module 7 is electrically connected to the suppressor 6 to convert the alternating current into direct current.

Please refer to FIGS. 1 and 2. In this embodiment, at least one LED component 8 is provided, but embodiments are not limited thereto. The LED component 8 is electrically connected to the voltage buck-booster module 7 to receive the direct current. The two pins 3 of each of the conductive pin assemblies 2 receive the outer power source, so that the power source can completely pass through one of the voltage conversion devices 5. Then, the voltage buck-booster module 7 can convert the outer power source and transmits the converted outer power source to the LED component 8.

Please refer to FIGS. 1 and 2. In this embodiment, the LED lamp tube 1 can be compatible with following two kinds of rectifiers: the first kind of rectifier includes an inductor rectifier 9 and a starter 10, the inductor rectifier 9 is electrically connected to one of the pins 3 of one of the conductive pin assemblies 2, and the starter 10 is electrically connected to the pins 3 of each of the conductive pin assemblies 2. The second kind of rectifier includes an electronic rectifier 11 and a plurality of capacitors 12, the electronic rectifier 11 is electrically connected to each of the pins 3 of each of the conductive pin assemblies 2, the capacitors 12 are respectively connected to each of the voltage conversion devices 5, and the capacitors 12 are used to limit and stabilize the electronic rectifier 11 to output voltages.

Please refer to FIGS. 1 and 2. In this embodiment, the LED lamp tube 1 further comprises a holder 13 and a lampshade 14. The holder 13 is used for assembling with the conductive pin assemblies 2, the polarity conversion module 4, the suppressor 6, the voltage buck-booster module 7, and the LED component 8. The lampshade 14 is assembled to the holder 13 to shield the LED component 8. In this embodiment, the LED lamp tube 1 is a T type lamp tube (which may be a T8 lamp tube, a T10 lamp tube, or a T12 lamp tube).

Figure 3:
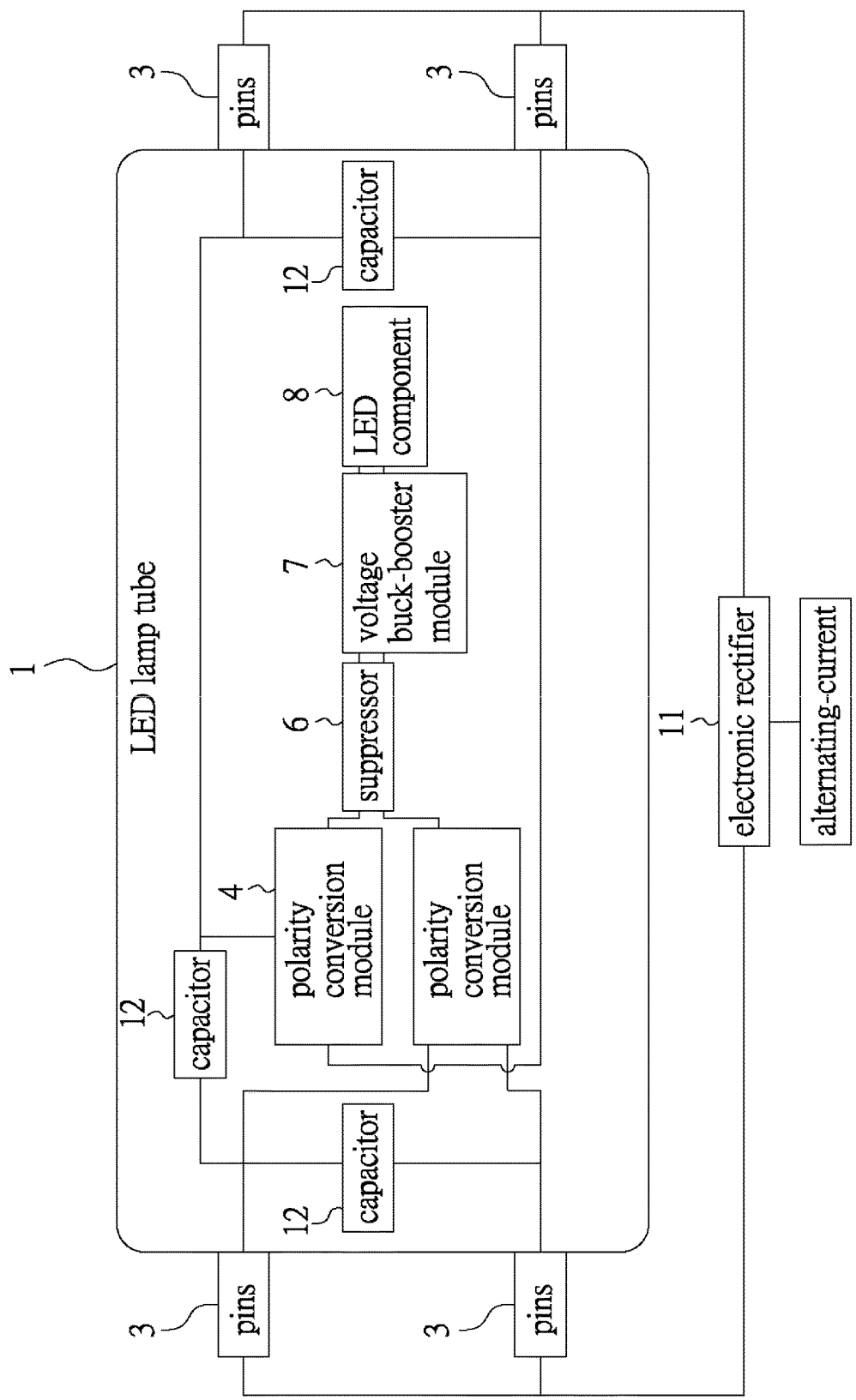
FIG. 3 illustrates a circuit block diagram of an LED lamp tube according to a second embodiment of the present invention.
Figure 4:
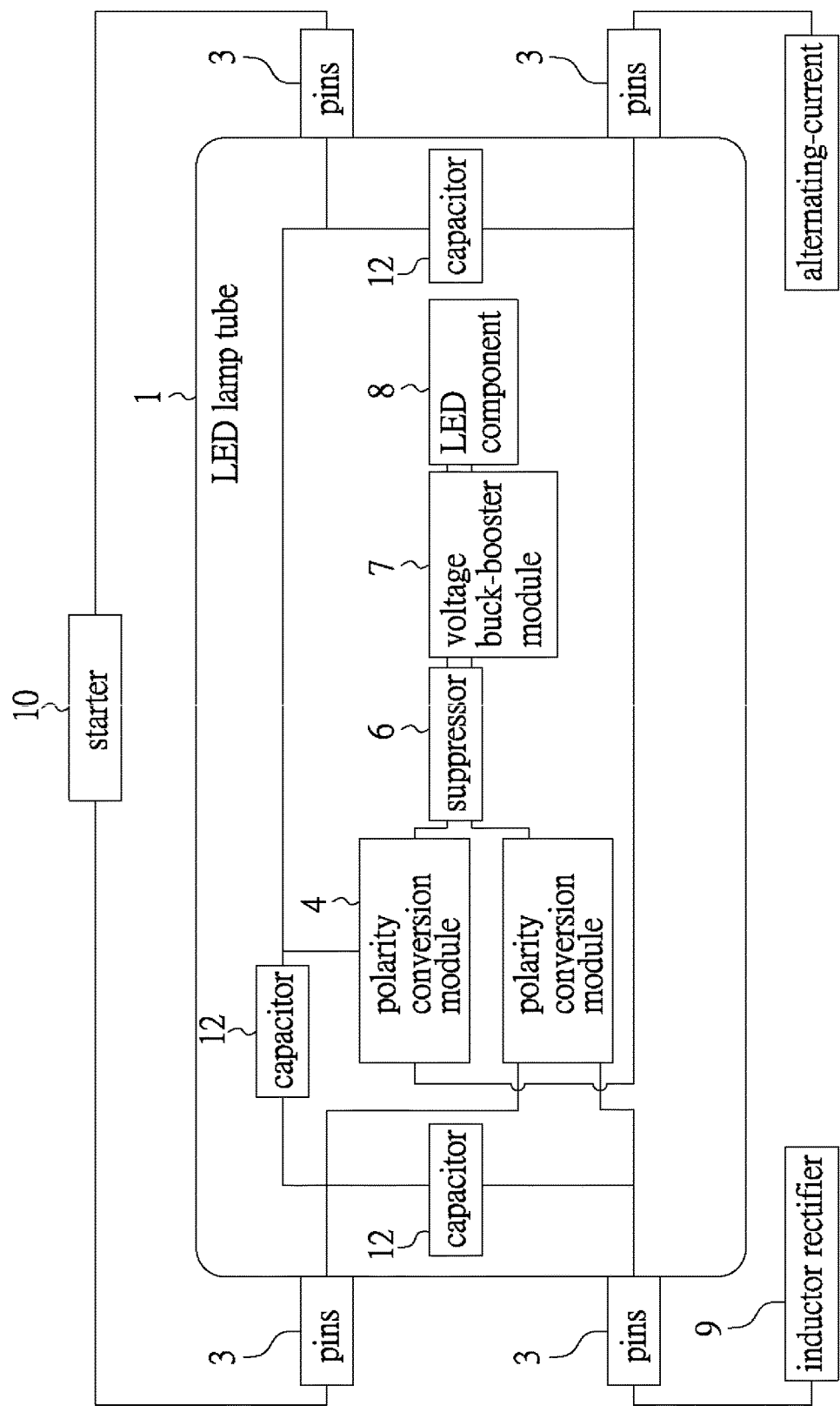
FIG. 4 illustrates a circuit block diagram of an LED lamp tube according to a third embodiment of the present invention.

Please refer to FIGS. 1 to 4. FIG. 3 illustrates a circuit block diagram of the LED lamp tube adapted to be mated with an inductor rectifier. FIG. 4 illustrates a circuit block diagram of the LED lamp tube adapted to be mated with an electronic rectifier. FIGS. 3 and 4 are also respectively the second and the third embodiments of the LED lamp tube of the present invention. As shown in FIG. 3, the LED lamp tube 1 not only comprises the two conductive pin assemblies 2, the polarity conversion module 4, the suppressor 6, the voltage buck-booster module 7, and the LED component 8, the LED lamp tube but also further comprises an inductor rectifier 9 and a starter 10.

Please refer to FIGS. 1 to 4. In this embodiment, the LED lamp tube 1 comprises the inductor rectifier 9 and the starter 10. The inductor rectifier 9 is electrically connected to one of the pins 3 of one of the conductive pin assemblies 2, and the starter 10 is connected to the pins 3 of each of the conductive pin assemblies 2.

As shown in FIG. 4, the LED lamp tube 1 not only comprises the two conductive pin assemblies 2, the polarity conversion module 4, the suppressor 6, the voltage buck-booster module 7, and the LED component 8, the LED lamp tube 1 but also further comprises an electronic rectifier 11 and a plurality of capacitors 12.

Please refer to FIG. 4. In this embodiment, the electronic rectifier 11 is electrically connected to each of the pins 3 of each of the conductive pin assemblies 2, the capacitors 12 are respectively connected to each of the voltage conversion devices 5, and the capacitors 12 are used to limit and stabilize the electronic rectifier 11 to output voltages.

Please refer to FIG. 4. A set of capacitors 12 is connected between the input ends of each of the voltage conversion devices 5 to operate a circuit in an electronic rectifier 11 to perform compensation, so that the input voltage of the lamp tube can be stabilized and the lamp tube can be operated reliably. In these embodiments, in the case that the inputted power source is the electronic rectifier 11 or the inductor rectifier 9, the suppressor 6 may be applied to absorb the generated surge voltage to prevent the lamp tube being damaged by the surge voltage upon the light is turned on.

Hence, when the alternating-current voltage is inputted to any two pins 3 of the conductive pin assemblies 2, the alternating-current voltage can pass through a complete bridge rectifier for rectifying. Therefore, a pulsed current can be provided for supplying the second-stage voltage buck and voltage booster as well as the LED light source.

According to embodiments of the present invention, the LED lamp tube 1 can be adapted to the electronic rectifier 11 or the inductor rectifier 9. Further, the inconsistency of the launching standards of the conventional LED lamp tube can be solved. Moreover, according to embodiments of the present invention, the LED lamp tube 1 can be operated with an alternating-current voltage. Additionally, according to the present invention, the lighting assembly with a traditional fluorescent lamp tube can be modified by LED lamp tube (T8, T10, or T12 lamp tube) in an easy manner. Specifically, for the modification of a light having a lamp tube activated by an inductor rectifier, the starter of the light is removed and the lamp tube is replaced by the LED lamp tube according to the present invention. Conversely, for the modification of a light having a lamp tube activated by an electronic rectifier, the lamp tube is just replaced by the LED lamp tube according to the present invention.

According to embodiments of the present invention, the polarity conversion circuit has a set of bridge rectifiers, input ends of the bridge rectifiers are connected to the conductive pin assemblies, and a set of capacitors are connected between the input ends of two bridge rectifiers to operate a circuit in an electronic rectifier to perform compensation, so that the input voltage of the lamp tube can be stabilized and the lamp tube can be operated reliably.

According to embodiments of the present invention, the LED lamp tube comprises the inductor rectifier and the starter. The LED lamp tube further comprises the suppressor. The suppressor ensures the surge voltage generated by the rectifier can be efficiently absorbed when the inputted power source is the electronic rectifier or the inductor rectifier so as to prevent the LED lamp tube being damaged by the surge voltage upon the light is turned on. Moreover, when the alternating-current voltage is inputted to any two pins of the conductive pin assemblies, the alternating-current voltage can pass through a complete bridge rectifier for rectifying. Therefore, a pulsed current can be provided for supplying the second-stage voltage buck and voltage booster as well as the LED light source.

Although particular embodiments of the invention have been described in detail for purposes of illustration, various modifications and enhancements may be made without departing from the spirit and scope of the invention. Accordingly, the invention is not to be limited except as by the appended claims.

All terms used in the above (including technology and scientific terms) have the same meanings as realized by the person having ordinary skills in the art. It is understood that, the definitions of those terms used in a dictionary should be understood as the meanings consistent with the relevant art, and unless the terminologies are clearly defined as lexicography, the terms shall not be realized in overly idealized or overly formal manner.

As above, the prevent invention is innovative and has the improved performance. The present invention is non-obvious in view of the relevant arts and has inventive steps and utility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An LED lamp tube capable of rectifying and stabilizing voltages, wherein the LED lamp tube comprises an LED component in the LED lamp tube, and two ends of the LED lamp tube respectively comprise two conductive pin assemblies, each of the conductive pin assemblies is formed by two pins, the LED lamp tube further comprises a polarity conversion module, a suppressor, and a voltage buck-booster module, the polarity conversion module comprises two voltage conversion devices, the voltage conversion devices are respectively connected to the conductive pin assemblies, wherein a capacitor is electrically connected between each of the voltage conversion devices, the suppressor is electrically connected to the polarity conversion module to absorb a generated surge voltage, the voltage buck-booster module is electrically connected to the suppressor to convert alternating current into direct current;

wherein, input ends of the voltage conversion devices are respectively connected to the conductive pin assemblies, a set of capacitors is connected between the input ends of each of the voltage conversion devices to operate a circuit in an electronic rectifier to compensate and stabilize an input voltage.

2. The LED lamp tube according to claim 1, wherein the LED lamp tube further comprises a holder for assembling the conductive pin assemblies, the polarity conversion module, the voltage buck-booster module, and the LED component, and the LED lamp tube further comprises a lampshade assembled to the holder to shield the LED component.

3. The LED lamp tube according to claim 2, wherein the LED lamp tube is a T type lamp tube.

4. The LED lamp tube according to claim 3, wherein the LED lamp tube is a T8 lamp tube, a T10 lamp tube, or a T12 lamp tube.

5. The LED lamp tube according to claim 1, further comprising an inductor rectifier and a starter, wherein the inductor rectifier is electrically connected to one of the pins of one of the conductive pin assemblies, and the starter is connected to the pins of each of the conductive pin assemblies.

6. The LED lamp tube according to claim 1, wherein the electronic rectifier is limited and stabilized by the set of capacitors to output voltage.

7. The LED lamp tube according to claim 1, wherein each of the voltage conversion devices is a rectifier.

8. The LED lamp tube according to claim 7, wherein each of the rectifiers is a bridge rectifier.

9. The LED lamp tube according to claim 1, wherein an outer power source is connected to the two conductive pin assemblies.

\* \* \* \* \*